United States Patent [19]

Jackson

[11] Patent Number: 5,024,870
[45] Date of Patent: Jun. 18, 1991

[54] METHOD FOR POTTING PLEATED FILTER MEDIA AND FILTERS MADE THEREBY

[75] Inventor: William E. Jackson, Bloomington, Minn.

[73] Assignee: Donaldson Company, Inc., Minneapolis, Minn.

[21] Appl. No.: 16,278

[22] Filed: Feb. 19, 1987

[51] Int. Cl.$^5$ .................. B32B 3/28; B01D 27/00; B65B 7/00

[52] U.S. Cl. .................. 428/181; 428/182; 428/192; 428/194; 428/167; 156/69; 156/293; 156/295; 55/497; 55/498; 55/510; 55/514; 55/521; 55/529; 55/502; 55/DIG. 5; 210/493.2; 210/493.5; 210/487; 264/DIG. 48

[58] Field of Search .................. 156/69, 245, 304.5, 156/293, 294; 428/117, 156, 118, 167, 194, 332, 181, 286, 296, 184, 192, 182, 34.2, 6.8, 121, 130; 55/498, 510, 514, 497, 521, 525, 528; 210/493.2, 493.3, 487, 490, 491, 492, 493 B, 502, 505, 508; 264/DIG. 48, DIG. 41, DIG. 60

[56] References Cited

U.S. PATENT DOCUMENTS

| | | |
|---|---|---|
| 2,749,265 | 6/1956 | Fricke et al. ............ 156/69 |
| 2,771,156 | 11/1956 | Kasten et al. ............ 156/69 |
| 3,042,571 | 7/1962 | Jackson ............ 210/493.2 |
| 3,133,847 | 5/1964 | Millington ............ 156/69 |
| 3,170,826 | 2/1965 | Norton et al. ............ 156/69 |
| 3,306,794 | 2/1967 | Humbert, Jr. ............ 156/69 |
| 3,354,012 | 11/1967 | Forman et al. ............ 156/69 |
| 3,423,909 | 1/1969 | Bennett et al. ............ 55/510 |
| 3,547,719 | 12/1970 | Kasten ............ 156/69 |
| 3,867,294 | 2/1975 | Pall et al. ............ 210/293.2 |
| 3,937,663 | 2/1976 | Bessiere ............ 55/498 |
| 4,036,616 | 7/1977 | Byrns ............ 156/69 |
| 4,104,170 | 8/1978 | Nedza ............ 55/498 |
| 4,120,711 | 10/1978 | Gudeman ............ 156/69 |
| 4,126,557 | 11/1978 | Hodgkins ............ 210/493.3 |
| 4,151,095 | 4/1979 | Wright ............ 55/498 |
| 4,184,966 | 1/1980 | Pall ............ 55/498 |
| 4,239,625 | 12/1980 | Hlavinka ............ 210/293.2 |
| 4,350,509 | 9/1982 | Alseth et al. ............ 55/498 |
| 4,389,315 | 6/1983 | Crocket ............ 210/413 |
| 4,512,892 | 4/1985 | Ganzi et al. ............ 55/498 |
| 4,663,041 | 5/1987 | Miyagi et al. ............ 210/493.2 |
| 4,664,684 | 5/1987 | Dun et al. ............ 210/293.2 |
| 4,664,801 | 5/1987 | Thomas ............ 210/293.2 |
| 4,735,720 | 4/1988 | Kersting ............ 55/498 |

*Primary Examiner*—Ellis P. Robinson
*Assistant Examiner*—Donald J. Loney
*Attorney, Agent, or Firm*—Merchant, Gould, Smith, Edell, Welter & Schmidt

[57] ABSTRACT

The invention includes a filter element (10) having a pair of end caps (12) with pleated, corrugated filter media (14) spanning therebetween. The filter media (14) is sealed or potted into the end caps (12) with a potting material ( b 16). To ensure substantially uniform penetration of the plates of the media (14) by the potting material (16), the edges of the media (14) are configured to eliminate "linear check valve" action between pleats. Several edge patterns can be used to minimize the formation of linear check valves, including a saw tooth pattern; sine wave pattern; vertical edge corrugations; flat edge regions; and saw kerfs in the edges of the media.

23 Claims, 4 Drawing Sheets

METHOD FOR POTTING PLEATED FILTER MEDIA AND FILTERS MADE THEREBY

FIELD OF THE INVENTION

The present invention relates generally to filters and methods for making filters, and more particularly to pleated filter media and methods for potting the ends of the pleats.

BACKGROUND OF THE INVENTION

Filters typically include porous filter media which is permeable to a fluid medium (liquid or gas) but is impermeable to particulate matter. The media is usually relatively thin paper (of cellulosic or synthetic material, e.g., polyester).

The removal of particulate matter, e.g., dust, is accomplished by passing the fluid, e.g., air, through the filter media. Dust collects on the filter media thus gradually filling its pores and increasing the restriction of the filter, thereby increasing the pressure drop across the filter and the load on the air-moving fan or blower, or reducing air flow through the filter.

Thus, a successful filter must have a large enough area of filter media to keep the restriction to an acceptably low level for an acceptable time of use; must be very efficient in terms of capturing particulate matter; and must be capable of either being replaced or of being cleaned at sufficiently frequent intervals to prevent dirt from accumulating to a point where the filter is too restrictive.

To meet the objectives outlined above, pleated filters were developed. Pleated filters typically include cellulosic or synthetic filter media which is quite thin and is folded in zigzag (accordian-like) fashion to produce a plurality of pleats. Each pleat is made up of a pair of rectangular panels, with fold lines separating the panels, and the pleats and fold lines of a pleated filter usually run vertically (substantially perpendicular to the end caps, discussed below). To provide even more area, while also holding the panels apart to insure maximum access, corrugated media was introduced. Clearly, pleated filters, whether corrugated or not, can have very large surface areas compared to their volumes and thus can provide acceptably low flow restrictions.

A typical pleated filter cartridge or element is made up of a pair of metal or plastic end caps spanned by pleated filter media, with the pleats and fold lines normally running from one end cap to the other, with the corrugations at right angles to the pleat tips (or parallel to the end caps) to provide for open air flow to the entire panel width. The ends of the media are potted or sealed into the end caps using a potting material such as plastisol, urethane, hot melt or epoxy. The end caps can either be circular, obround or elliptical, in the case of a cylindrical filter element, or rectangular, in the case of a "panel" filter. See, e.g., U.S. Pat. No. 4,204,846, where rectangular panel filters are employed in a cabinet cleaner. The filter media edges are sealed or potted in end caps to facilitate mounting and sealing replaceable filter elements in an air duct such that dirty air has to flow through the filter media and cannot by-pass it.

Although pleated filters have substantially met the objectives outlined above, as a class they suffer from some drawbacks. For example, pleats tend to collapse as a result of the differential pressure they must withstand, resulting in less effective surface area available for filtering. Pleat collapse problems have been addressed in various ways. One successful technique, disclosed in U.S. Pat. No. 4,443,235, involves the use of hot-melt deposits or spacers applied to the pleat panels to maintain a minimum separation therebetween.

Another problem associated with pleated filters as a class is that they, like all filters, tend to become plugged or clogged during use. In the event of substantial plugging, a filter element can be replaced or cleaned. Fortunately, there are several suitable techniques for cleaning plugged filter elements. For example, U.S. Pat. No. 4,331,459 discloses a method of pulsing air backwards through a pleated filter to dislodge the dust cake on the dirty side of the media.

Thus, several problems associated with pleated filters have been successfully addressed, at least to a degree. One problem, however, has defied solution for many years: some of the pleated filter elements of a given production run tend to leak. More specifically, pleated filters sometimes allow dirty air to shunt around their media, thereby allowing dirty air to pass through. It has long been recognized that the leak problem is associated with potting the ends of the pleats during filter element construction.

Occasionally, and intermittently, voids have occurred in the potting material such that dirty air can flow through the voids in the potting material rather than through the filter media. Since the air that flows through the voids or "short circuit paths" is not filtered, this reduces the overall filtering efficiency of the cartridge or element, particularly in view of the fact that air, like all fluids, will choose the path of least resistance.

While the leak problem associated with pleated filters occurs only intermittently, the problem seems to occur most often when corrugated pleated media is used. As discussed above, corrugated filter media typically includes corrugations which run horizontally, perpendicular to the fold lines and the pleats. The corrugations serve to separate the pleats and the panels thereof to ensure that all of the filter media comes into play (see FIG. 2). The leak problem also seems to occur more often with high pleat densities, although even then only some elements out of a set of apparently identical elements in a production run will exhibit the problem. This explains why the problem has resisted solution for so long.

Several solutions to the pleat potting problem have been proposed. For example, it was once thought that overheating the adhesive-plastisol potting formulation at the metal end cap/plastisol interface during the plastisol curing process was responsible for the voids and leaks. While overheating can cause gas generation, the effect is somewhat different and in any event lowering the hot plate temperature to the point where adhesion was poor to lacking, and the plastisol inadequately cured, failed to eliminate voids and leaks.

The leak problem associated with pleated filters was also blamed on the potting material itself. Several different materials were tried, but the problem intermittently reoccurred.

These and other proposed solutions have been tried, to no avail. The leak problem has resulted in the scrapping of finished filter elements, on occasion. Even minor filter media leaks are particularly unacceptable to the military as they, not surprisingly, have very strict specifications as to filter efficiency and reliability.

In response to this long-standing problem, the applicant examined several filters by removing the end caps and cutting out sections of the potted filter media. This examination revealed voids in the potting material and a pattern of non-uniform penetration of the spaces between the pleats by potting material, with a noticeable absence of potting material adjacent the voids. Upon observation of these phenomena, the applicant theorized that the edges of some of the adjacent corrugated panels were acting together to form "check valves" capable of limiting or altogether blocking the flow of a potting material. FIGS. 4A and 4B, "stop action" views of a prior art filter during assembly, illustrate the applicant's theory diagrammatically. In FIG. 4A, the lower vertical arrows show the relative motion of the plastisol as the media assembly is inserted into the plastisol. As the media enters the plastisol, the surface of each pleat panel is deflected as shown by the small horizontal arrows (just as a rudder is deflected by the flow of water against it). This tends to pinch off the flow of plastisol at "linear check valves" 28 where the edges are pushed together if the media edge happens to be close enough to the maximum amplitude of the corrugation wave pattern. At the same time, the deflection of the media that closes off flow at "check valves" 28 opens up flow at 29 even more. If, after this occurs, the relative motion is reversed, atmospheric air tries to fill in the space vacated by the media/wet plastisol unit. The path of least resistance is through the spaces 28 between the pleats where the plastisol did not penetrate. Reverse motion might occur through tilting the media pack or correcting a hung-up liner, through media shrinkage or even through clamp relaxation. When the assembly is pushed back in (see FIG. 4B), the initial situation is restored and the air cannot readily retreat the way it came in. This results in the large voids found in bad elements. Many times (maybe even most of the time) these voids do no real harm, but on occasion an opening to the opposite side of the filter occurs, whether through passage of air from one of these bubbles through a pleat space previously filled (or only partly filled) with plastisol, or by some other fault.

Once the "check valve" mechanism was recognized, it was apparent that the voids and leaks could be avoided by eliminating all forms of repositioning or withdrawal of the media assembly from the potting material. This follows from the idea that withdrawal of the media from the potting media required the vacated space to be filled by something else; and that where pleat penetration had not occurred the most likely replacement would be air flowing under atmospheric pressure between those open pleats (see FIG. 4B). However, despite improved fixtures and operator awareness, this was not 100% achievable. It would also leave alternating high and low (or no) pleat penetrations, a weaker construction.

The present invention addresses the problems associated with potting pleated filters. The invention is particularly aimed at potting corrugated pleated filters media in such a way as to eliminate voids in and leaks through the potting material.

SUMMARY OF THE INVENTION

In broad terms, the invention is directed toward a method for potting pleated, corrugated filter media, including the following steps:

(a) selecting an end cap;

(b) filling the end cap with an operative amount of potting material;

(c) selecting a filter media;

(d) configuring the edge of the filter media so as to substantially eliminate linear check valves between adjacent panels and pleats; and (e) inserting the filter media edge into the end cap, whereby the potting material substantially uniformly penetrates the edges of the pleats due to the absence of linear check valves at the edge of the filter media.

Of course, the invention also includes making an entire filter element using the method set forth above.

The "configuring" step can include imparting a sine wave or saw tooth pattern in the edges of the pleated filter media. Preferably, the pattern width of the sine wave or saw tooth is between approximately ¼ to ¾ the wave length of the corrugation in the media. Further, the wave length of the sine wave or saw tooth pattern is directly related to the depth of the media corrugation, and more preferably is between approximately 1/16 and ⅛ inch.

The "configuring" step can also include imparting edge corrugation patterns in the edges of the media perpendicular to the main corrugations; rendering the edges of the filter media flat; or imparting a square wave pattern in the media edges by, for example, means of saw kerfs in the media edges.

The invention also includes filter elements made according to the methods described briefly above.

The invention will be further described with reference to the attached Drawing, briefly described below.

DETAILED DESCRIPTION OF PREFERRED EMBODIMENTS

Figure 1:
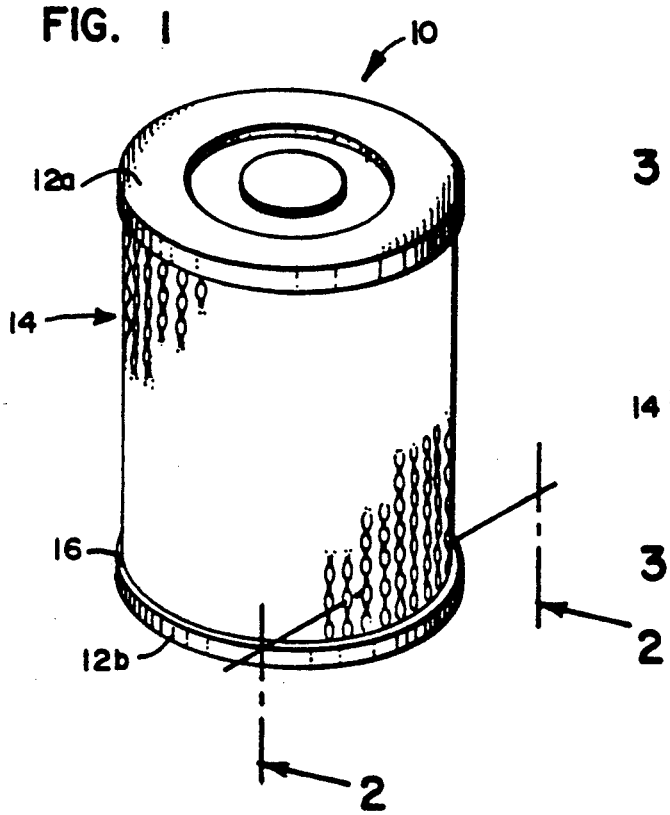
FIG. 1 is a perspective view of a cylindrical filter element constructed according to the invention, having a pair of end caps and corrugated pleated filter media potted therein and spanning therebetween.

Referring to the Drawing, wherein like reference numerals designate like parts and assemblies throughout the several views, FIG. 1 shows a cylindrical element 10 constructed according to the present invention. As discussed above, the invention is directed toward potting the ends of pleated filter media, and is certainly not limited to cylindrical elements. However, for the sake of brevity, the discussion will focus on cylindrical elements.

Cylindrical elements 10 preferably includes a pair of metal end caps 12a and 12b. Such end caps are well known, typically being constructed from light gauge steel using ordinary stamping or drawing techniques. It should be noted that some light duty elements do not include structural end caps in addition to the potting material itself. For example, standard automotive air filters do not include metal end caps. The potting technique discussed below is applicable to such filters nonetheless.

Spanning between end caps 12a and 12b is a substantially continuous piece of pleated, corrugated filter media 14. Media 14 can be cellulosic paper or a synthetic material, e.g., polyester, and is usually quite thin (0.015 inch thick, for example). The fold lines and pleats of filter media 14 typically run vertically (perpendicular to the end caps 12a and 12b), whereas the corrugations typically run horizontally (parallel to the end caps 12a and 12b).

So as to ensure that all of the dirty air flows through the filter media 14, the ends of media 14 are potted or sealed in the end caps 12a and 12b using a potting material 16. Any of a wide variety of materials can be used to pot filter media, including plastisol, urethanes and epoxies.

In use, the cylindrical cartridge 10 is mounted in a housing or the like, with end caps 12a in sealing contact with the housing, thereby exposing all of the filter media 14 to air flow and forcing dirty air to flow through media 14. For the cylindrical cartridge 10 shown in FIG. 1, dirty air would normally flow radially inward through the media 14 and the resulting clean air would flow axially downward through a hole in annular end cap 12b and the housing.

Figure 2:
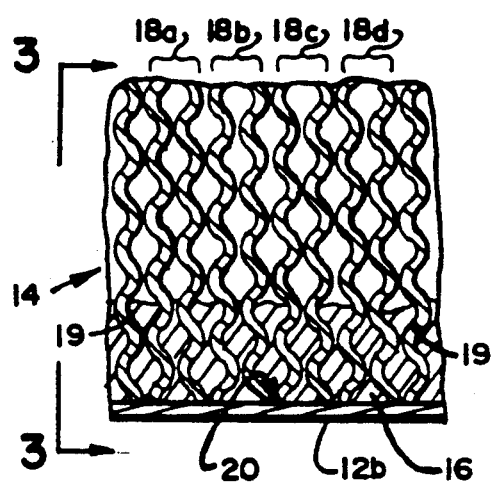
FIG. 2 is an enlarged sectional view taken along plane 2—2—2—2 of FIG. 1, showing substantially uniform penetration of the potting material between the pleats and between the corrugated panels of each pleat.

FIG. 2 is an enlarged cross sectional view taken through plane 2—2—2—2 of FIG. 1. FIG. 2 shows the bottom portion of the filter media 14 immersed in potting material 16. As shown in FIG. 2, filter media 14 is made up of a plurality of pleats 18, and each pleat 18 includes a pair of corrugated panels 19 with fold lines (not shown) between adjacent corrugated panels 19. The corrugations run parallel to the top and bottom surfaces of the end caps 12. As depicted in FIG. 2, the corrugations typically form a "sine wave" pattern. The corrugation wave length (distance between adjacent peaks) varies, but a common media has a corrugation wave length of about 0.222 inch (4.5 corrugations per inch). The corrugated media 14 is slit to form an upper edge (not shown) and a lower edge 20. The upper and lower edges are potted in potting material 16 which is contained within the end caps 12. It is desirable that the potting material 16 substantially uniformly penetrate the pleats 18, as shown in FIG. 2. Uniform pleat penetration eliminates short circuit paths and voids which can allow dirty air to circumvent the filter media 14.

Figure 3:
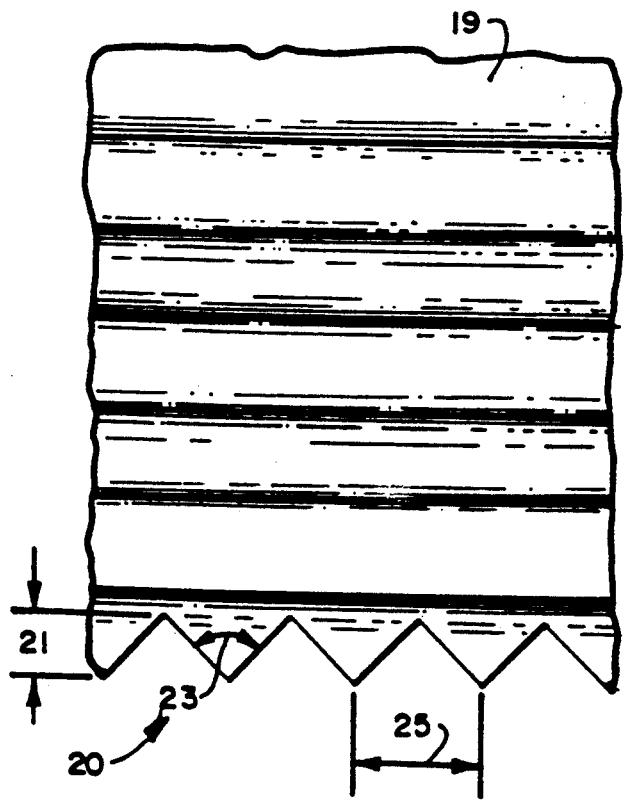
FIG. 3 is an enlarged elevational view of the lower end of one of the panels of suitably slitted pleated filter media according to the present invention for the element of FIG. 1.

FIG. 3 shows an enlarged side elevational view of the lower portion of one of the corrugated panels 19. Of particular importance is the saw tooth pattern formed by the lower edge 20 of the corrugated panel 19. As further described below, the saw tooth pattern improves the likelihood that the pleats will be uniformly penetrated with potting material. The saw tooth pattern on the lower edge 20 of corrugated panel 19 is preferably made using "pinking" shears or the like. Pinking cutter wheels can be used rather than straight cutting wheels to slit the ends of the filter media 14. Suitable pinking wheels are sold by Alcon Tool Company, Akron, Ohio. Although other saw tooth configurations are contemplated, a preferred configuration is shown in FIG. 3. This "pinked", or saw tooth, pattern, or any other periodic pattern, has a "pattern width" (peak-to-peak distance) and a "wave length". The saw tooth pattern width 21 is approximately 0.095 inch; the saw tooth wave length 25 is approximately 0.1905 inch (5¼ teeth per inch,; making the saw tooth angle 23 approximately 90 degrees. The preferred wave length of the slit pattern (saw tooth or other patterns) depends on the corrugation depth (the greater this depth, the longer the usable wave length), but in general would be approximately 1/16 to ⅛ inch.

As discussed above, FIGS. 4A and 4B are stop-action enlarged sectional views of prior art filter media in mid-assembly. FIG. 4B illustrates the voids which can occur as a result of unfilled pleat spaces when, for whatever reason, the prior art media assembly is even partially withdrawn from the potting material. Clearly such unfilled spaces and voids are disadvantageous since on completion of assembly they can result in the air bubbles being pushed through previously closed spaces thereby producing a shunt or by-pass route for dirty air.

Figure 4A:
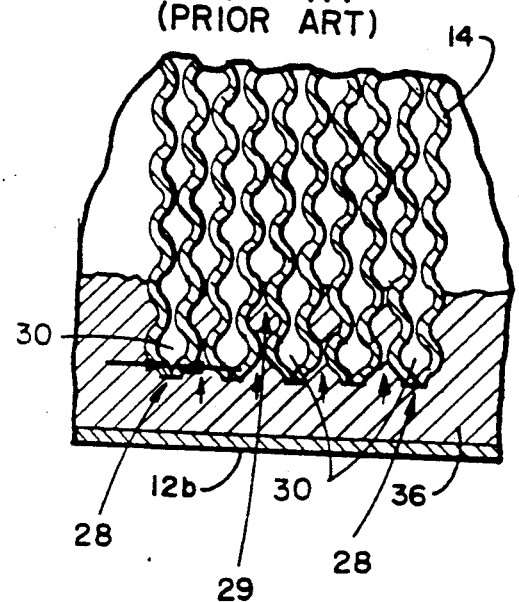
FIG. 4A is an enlarged sectional view in the nature of FIG. 2, showing in "stop-action" fashion the non-uniform pleat penetration occasioned by the initial insertion of prior art filter media into potting material.
Figure 4B:
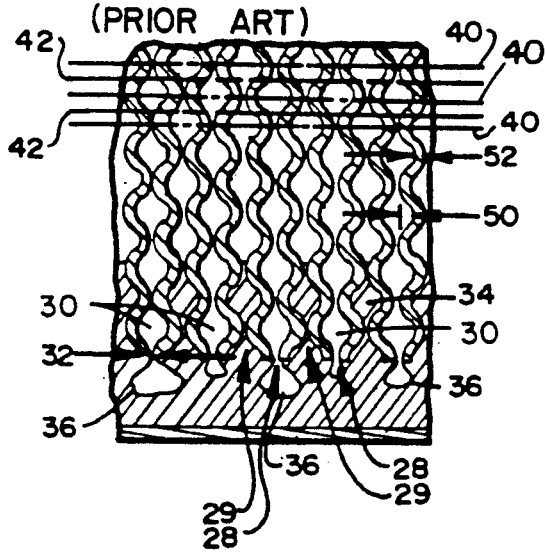
FIG. 4B is an enlarged "stop-action" sectional view in the nature of FIG. 4A of a prior art element illustrating voids in the potting material resulting from withdrawing the media from the potting material.

Still referring to FIGS. 4A and 4B, the Applicant discovered that a "linear check valve" 28 was forming between pleats when the corrugated pleats were slit at or near a particular point in the corrugation cycle, i.e., at the "peaks" or "valleys" of the corrugations. "Linear check valve" 28 prevents potting material from flowing into the pleat space 30. This explains why the problem was particularly prevalent when close packed (high pleat count, relatively thick) corrugated media was used. It was discovered that the ends of the panels were acting as check valves, in effect, when immersed in the potting material. As the media entered the potting material, the surface of each pleat panel was deflected as shown by horizontal arrows 32, just as a rudder is deflected by the flow of water against it. This tended to pinch off the flow of potting material where the edges were pushed together (at the linear check valves 28). This phenomenon occurred if the media was cut at or near the maximum (or minimum) of the corrugation wave pattern, designated with reference numeral 40 in FIG. 4B. Not only would potting material not flow into unfilled pleat spaces 30, but even more potting material would flow into pleat spaces 34. If the corrugated media was cut at or near the peaks or valleys 40, linear check valves were produced. Conversely, if the media was cut midway between the peaks or valleys, at or near lines 42, the linear check valves were not produced. For all practical purposes, however, it is virtually impossible to dictate exactly at what point in the corrugation cycle the media will be cut. And, even if the slitting operating could be controlled this closely, the usable lengths of the media would then be limited to multiples of one-half the corrugation wave length.

Typical filter fabrication techniques only exacerbate the problem. Oftentimes the filter media is withdrawn from the potting material during construction of the filter element (to intentionally reposition it because of liner or screen hang-up, etc., or because of inadvertent vertical motions associated with typical assembly procedures and fixtures). This causes atmospheric air to fill the space vacated by the media and adhered potting material. The path of least resistance is through the unfilled spaces 30 where the potting material failed to penetrate. Finally, when the media is reinserted into the potting material, the ends of the panels again function as linear check valves, thus retaining air bubbles or voids 36 in the potting material. While such voids very often do no real harm, on occasion they form shunts or short circuits to the clean side of the filter.

The extent to which this kind of check valve action can occur depends on where in the corrugation wave or cycle the media happened to be cut. The worst case, most conducive to check valve action, would be at either extreme, top or bottom, of the corrugation ribs. The best case, least conducive to check valve action, would be when the panel is slit midway between either extreme. Referring again to FIG. 4B, worst case slit lines are designated with reference numerals 40, whereas best case slit lines are designated with reference numerals 42. As previously discussed, the location of the slit is an important factor in determining whether the check valve phenomenon will occur. However, the problem can only occur in conjunction with one or more of several other contributing factors. The sum of the corrugation depth (designated with numeral 50 in FIG. 4B) and the media base thickness (52 in FIG. 4B) multiplied by twice the pleat count must add up close enough to one inch or the deflection (32 in FIG. 4B) may not be sufficient to close off flow of the potting material, depending on the viscosity of the potting material and the rate of insertion of the media. Apparently, there is no precise dimension or value for the left over space between pleats that marks the transition from trouble-free penetration by the potting material to insufficient penetration associated with "check valve" actions. The check valve phenomenon apparently depends on many factors, ranging from the exact location of the cut on the corrugation pattern to the viscosity or flow characteristics of the potting material and the speed of relative motion, certainly in inserting the media, and, possibly in withdrawing it. Distance withdrawn would be a factor as well. Besides all this, it must be recognized that uneven spacing will result in localized high pleat count and check valve action even when the nominal pleat spacing is such that no problem should occur.

It can now be seen how the saw tooth or pinked pattern disclosed in FIG. 3 facilitates substantially uniform potting material penetration. While some of the saw tooth peaks might meet or mesh to create very isolated check valve regions, the serrated edges will allow potting material to flow between corrugated panels irrespective of the slit line location. Thus, the saw tooth pattern interrupts the linear check valve which can be created when pleated corrugated media are packed quite densely. Since potting material can thereby readily flow between all of the corrugated panels 19 during initial insertion of the filter media into the potting material, voids are not formed even if the media needs to be repositioned during the element construction process. Thus it can be seen that the saw tooth pattern width is preferably large enough to substantially preclude the creation of linear check valves. Preferably, the saw tooth pattern width is on the order of ¼ to ¾ the corrugation wave length; most preferably, the pattern width is approximately ½ the corrugation wave length. Lesser saw tooth pattern widths would still offer a benefit, particularly with lower viscosity potting material, while greater pattern widths would most likely only require use of more potting material without added benefit.

Figure 5:
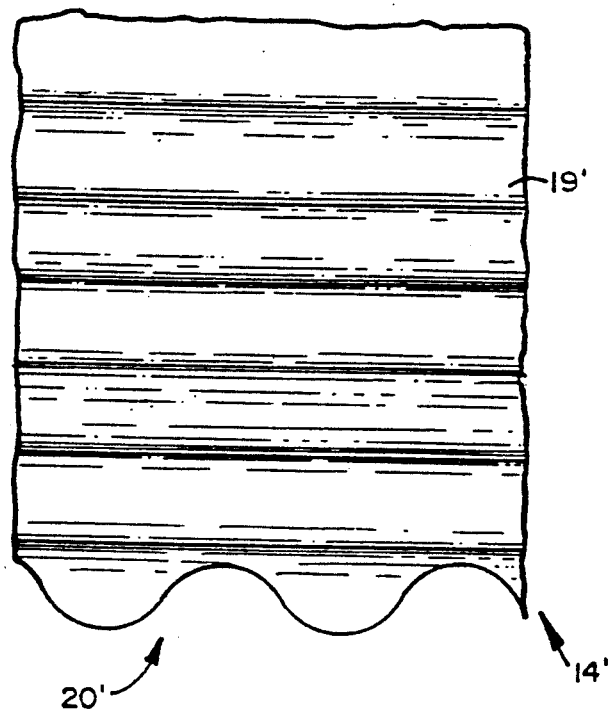
FIG. 5 is an enlarged elevational view of the lower end of a panel of a second type of slitted filter media suitable under, the present invention for use in the element of FIG. 1.

FIG. 5 shows a corrugated panel 19' of filter media 14' having a sine wave pattern cut into its upper (not shown) and lower edges 20'. The sine wave pattern shown in FIG. 5 serves the same function as the saw tooth pattern pictured in FIG. 3: it breaks up the linear check valve action created by adjacent panels or pleats in certain situations, i.e., high pleat counts coupled with relatively thick media and straight media slitting at or near a corrugation peak/valley. As in the case of the saw tooth pattern shown in FIG. 3, the sine wave preferably has a pattern width on the order of ¼ to ¾ the corrugation wave length, most preferably approximately equal to ½ the corrugation wave length. The media 14' can be slit to form a sine wave pattern using a circular cutter purchased from Alcon Tool Company of Akron, Ohio.

Figure 6:
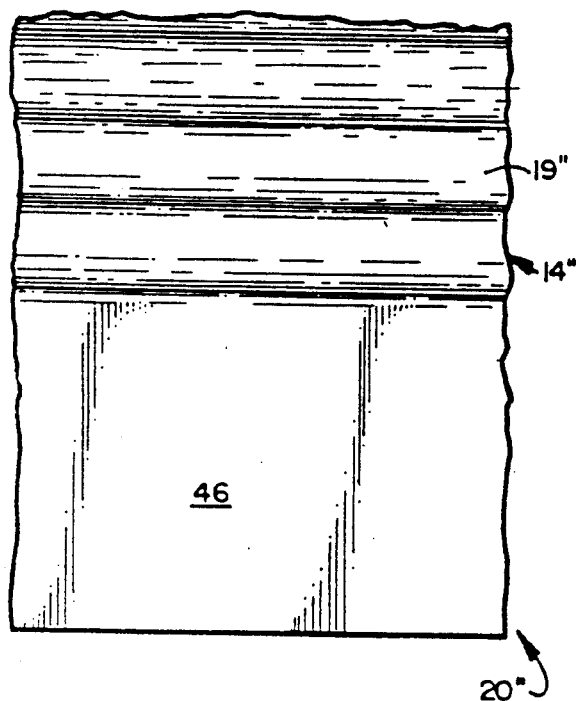
FIG. 6 is an enlarged elevational view of the lower end of a panel of a third type of filter media suitable for use in the element of FIG. 1.
Figure 7:
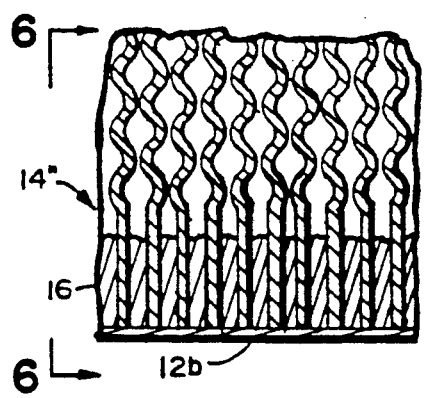
FIG. 7 is an enlarged sectional view in the nature of FIG. 2 of potted filter media constructed from panels of the type shown in FIG. 6.

FIG. 6 shows an enlarged elevational view of a third filter media 14" according to the invention. Corrugated panel 19" has flat areas 46 at either end, with only the lower end 20" being shown in FIG. 6. The flat areas 46 are preferably formed during the initial corrugation process of the media 14". In these areas, the media 14" is simply not corrugated, through the use of a special corrugation wheel or drum. Alternatively, corrugations can be removed in these areas by pressing the media. When the flat areas 46 are inserted into the potting material, as shown in FIG. 7, the check valve action associated with fully corrugated media, as shown in FIG. 4, is eliminated. Thus, potting material can uniformly fill the spaces between and within the pleats.

Figure 8:
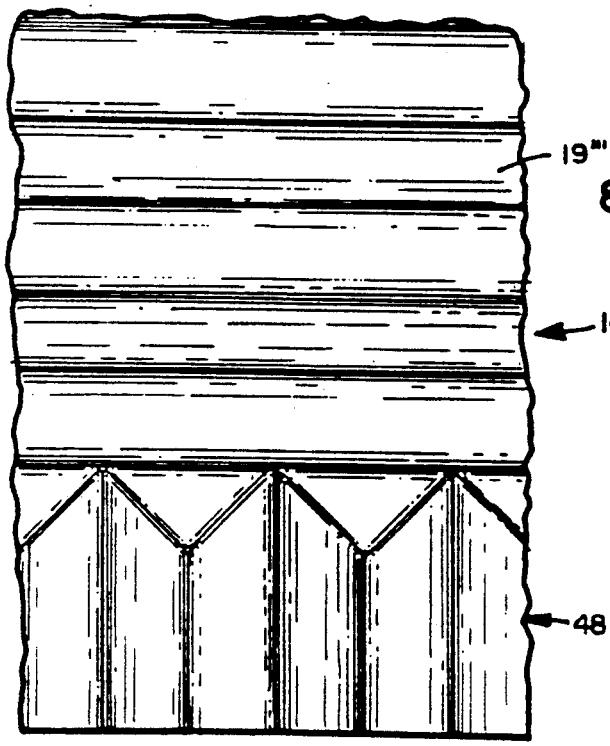
FIG. 8 is an enlarged elevational view of the lower end of a panel a fourth type of pleated filter media suitable for use in the element of FIG. 1.

FIG. 8 shows still another way to disrupt or substantially eliminate the check valve effect at the top and bottom edges of the filter media. Filter media 14''' actually has vertical corrugation areas 48 (as opposed to the horizontal corrugations in the central portion) at its top and bottom edges, the vertical corrugations being perpendicular to the main horizontal corrugations and the vertical corrugation wave length being preferably approximately equal to the horizontal corrugation wave length standardly impressed on the filter media. The vertical corrugation areas not only allow potting material to uniformly distribute, they may also impart some structural rigidity to the media which may make it easier to insert the media into the viscous potting material during the assembly process.

Figure 9:
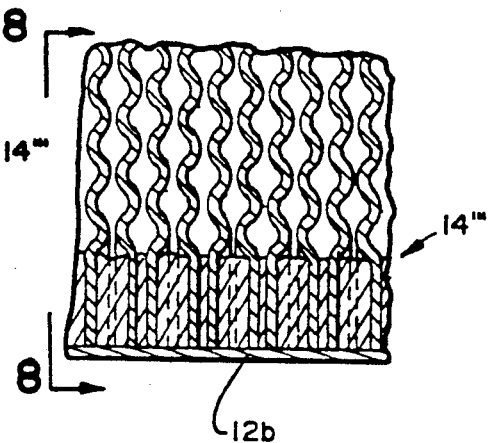
FIG. 9 is a cross sectional view of potted filter media comprised of panels of the type shown in FIG. 8.

FIG. 9 shows a sectional view of the media 14''' potted in an end cap 12b.

Figure 10:
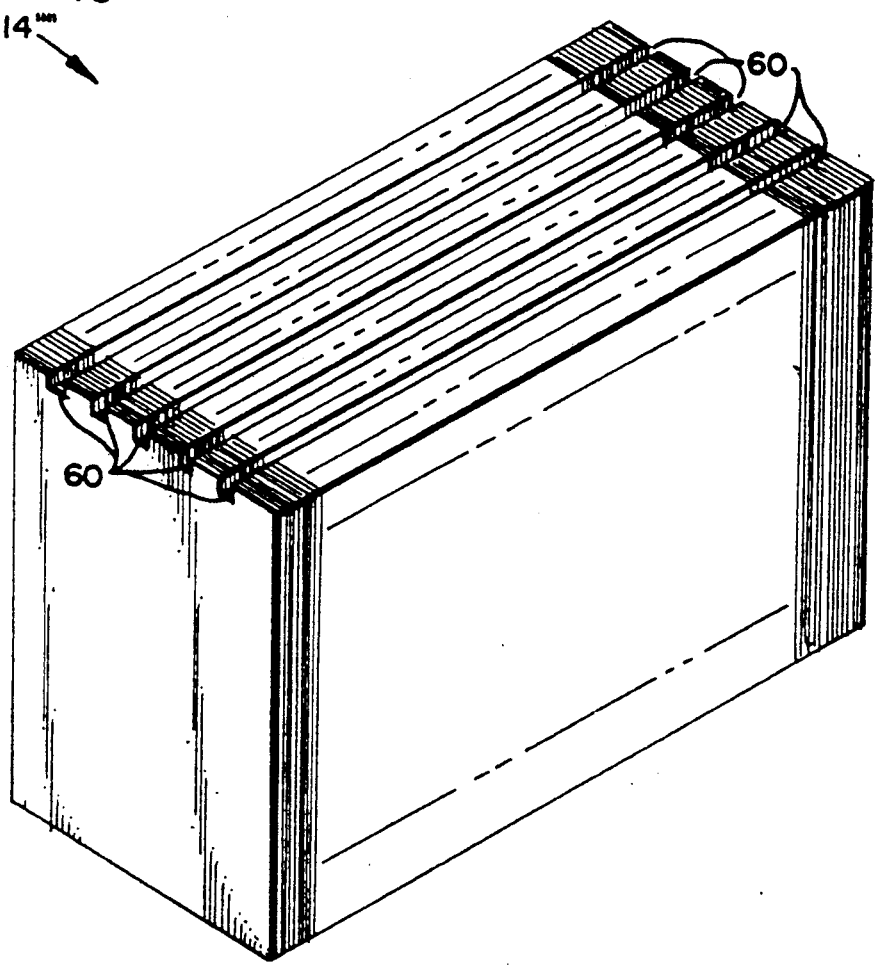
FIG. 10 shows a perspective view of a fifth type of pleated filter media suitable for use in the element of FIG. 1.

Finally, FIG. 10 illustrates a very simple way to eliminate the linear check valve phenomenon wherein five or more approximately equally spaced saw kerf cuts 60 (about 0.1 inch deep) are made down the length of a two inch wide pleated panel of the earlier straight cut style. Of course, the "kerfs" could be wide enough to form a "square wave" pattern in the panels in contrast to the saw tooth and sine wave patterns discussed above. A square wave pattern could be formed in a variety of ways, including sawing, milling, and using a rotary cutter. Further, the cuts need not be regularly spaced: it is necessary only to provide enough grooves or the like to interrupt the linear check valve action discussed above.

It should particularly be noted that the invention broadly includes methods for interrupting or eliminating the linear check valve effect sometimes associated with corrugated pleated media. Several embodiments of the invention are disclosed above, but the invention contemplates other methods for eliminating this check valve action. For example, any non-linear slit so that the two edges of adjacent pleats will not form a seal or linear check valve, could be used to eliminate the check valve action. The saw tooth, sine wave and kerf patterns illustrated above are not exhaustive. For example, an interrupted or intermittent groove corrugation could be utilized so that two adjacent edges would not come together for a sufficient length to form an effective seal. However, this would require special corrugation rolls of difficult manufacture.

Preferred embodiments of the invention have been disclosed. Other modifications of the invention which are not specifically disclosed or referred to will be apparent to those skilled in the art in light of the foregoing description. This description is intended to provide concrete examples of preferred embodiment structures and applications, clearly disclosing the present invention and its operative principles. Accordingly, the invention is not limited to any particular embodiments or configurations and variations of the present invention which fall within the spirit and broad scope of the appended claims are covered.

I claim:

1. A filter element comprising:
   (a) a pair of end caps;
   (b) pleated and corrugated panel filter media constructed and arranged for positioning between said end caps; said filter media having edges thereon for partially contacting said end caps in generally perpendicular relation; said corrugated filter media having sine wave shaped edges, and said corrugated filter media having a corrugation wave length and a sine wave pattern having a pattern width, said corrugation wave length and said sine wave pattern width relating in a ratio of approximately 2:1, and said sine wave pattern having a wave length of between about 1/16 and about ⅛ inch; and
   (c) sealing means including plastisol for placement in each of said end caps, said plastisol sealably receiving said edges of said filter media therein;
   (d) whereby said filter media edges permit substantially uniform penetration of said plastisol into a region between adjacent corrugated panels of said filter media within each of said end caps.

2. A filter element comprising:
   (a) a pair of end caps;
   (b) pleated and corrugated panel filter media constructed and arranged for positioning between said end caps; said filter media having edges thereon for partially contacting said end caps in generally perpendicular relation;
   (c) sealing means including potting material designed for placement in each of said end caps, said potting material sealably receiving said edges of said filter media therein; and
   (d) sine wave shaped edge means located on said filter media edges for providing substantially uniform penetration of said potting material into a region between adjacent corrugated panels of said pleated filter media within each of said end caps.

3. A filter element comprising:
   (a) a pair of end caps;
   (b) pleated, corrugated panel filter media having edges thereon constructed and arranged for positioning proximate said end caps;
   (c) potting material within said end caps for sealing said edges of said filter media therein, wherein said filter media edges are configured in a sine wave shape to permit substantially uniform penetration of said potting material into a region between adjacent corrugated panels of said pleated filter media within each of said end caps.

4. A filter element comprising:
   (a) a pair of end caps;
   (b) pleated and corrugated panel filter media constructed and arranged for positioning between said end caps; said filter media having edges thereon for partially contacting said end caps in generally perpendicular relation;
   (c) sealing means including potting material designed for placement in each of said end caps, said potting material sealably receiving said edges of said filter media therein; and
   (d) saw tooth shaped edge means located on said filter media edges for providing substantially uniform penetration of said potting material into a region between adjacent corrugated panels of said pleated filter media within each of said end caps.

5. A filter element comprising:
   (a) a pair of end caps;
   (b) pleated, corrugated panel filter media having edges thereon constructed and arranged for positioning proximate said end caps;
   (c) potting material within said end caps for sealing said edges of said filter media therein, wherein said filter media edges are configured in a saw tooth shape to permit substantially uniform penetration of said potting material into a region between adjacent corrugated panels of said pleated filter media within each of said end caps.

6. A filter element comprising:
   (a) a pair of end caps;
   (b) pleated and corrugated panel filter media constructed and arranged for positioning between said end caps; said filter media having edges thereon for partially contacting said end caps in generally perpendicular relation;
   (c) sealing means including potting material designed for placement in each of said end caps, said potting material sealably receiving said edges of said filter media therein; and
   (d) square wave shaped edge means located on said filter media edges for providing substantially uniform penetration of said potting material into a region between adjacent corrugated panels of said pleated filter media within each of said end caps.

7. A filter element comprising:
   (a) a pair of end caps;
   (b) pleated, corrugated panel filter media having edges thereon constructed and arranged for positioning proximate said end caps;
   (c) potting material within said end caps for sealing said edges of said filter media therein, wherein said filter media edges are configured in a square wave shape to permit substantially uniform penetration of said potting material into a region between adjacent corrugated panels of said pleated filter media within each of said end caps.

8. A method for making a filter element, including the steps of:
(a) selecting a pair of end caps;
(b) filling said end caps with an operative amount of plastisol;
(c) configuring a pleated filter media having corrugated panels therein to permit uniform penetration of plastisol between adjacent panels, wherein the configuring step comprises slitting said filter media to impart a sine wave pattern in edges thereof, said corrugated filter media having a corrugation wave length and a sine wave pattern having a pattern width wherein a ratio of said corrugation wave length and said sine wave pattern width is approximately 2:1, and wherein the wave length of said sine wave pattern is between approximately 1/16 inch and ⅛ inch; and
(d) inserting said corrugated filter media edges into the plastisol, whereby the edges are sealed and the plastisol substantially uniformly fills the spaces between said adjacent panels substantially independent of any movement of the filter media edges in the plastisol after initial insertion.

9. A method for making a filter element, including the steps of:
(a) selecting a pair of end caps;
(b) filling said end caps with an operative amount of potting material;
(c) configuring edges of a pleated, corrugated panel filter media by slitting the filter media to impart a square wave pattern in the edges thereof to permit substantially uniform penetration of said potting material between adjacent filter media panels; and
(d) inserting said filter media edges into said potting material, whereby said edges are sealed therein.

10. The method according to claim 9, wherein the square wave pattern is formed by saw kerfs.

11. A method for making a filter element, including the steps of:
(a) selecting a pair of end caps;
(b) filling said end caps with an operative amount of potting material;
(c) configuring edges of a pleated, corrugated panel filter media by slitting the filter media to impart a saw tooth pattern in the edges thereof to permit substantially uniform penetration of said potting material between adjacent filter media panels; and
(d) inserting said filter media edges into said potting material, whereby said edges are sealed therein.

12. The method according to claim 11, wherein the corrugated media has a corrugation length and wherein the saw tooth pattern has a pattern width between approximately ¼ to ¾ the corrugation length.

13. The method according to claim 11, wherein the corrugated media has a corrugation length and wherein the saw tooth pattern has a pattern width approximately equal to ½ to corrugation length.

14. The method according to claim 11, wherein the wave length of the saw tooth pattern is directly related to the depth of the media corrugation.

15. The method according to claim 11, wherein the wave length of the saw tooth pattern is between approximately 1/16 and ⅛ inch.

16. A method for making a filter element, including the steps of:
(a) selecting a pair of end caps;
(b) filling said end caps with an operative amount of potting material;
(c) configuring edges of a pleated, corrugated panel filter media by slitting the filter media to impart a sine wave pattern in the edges thereof to permit substantially uniform penetration of said potting material between adjacent filter media panels; and
(d) inserting said filter media edges into said potting material whereby said edges are sealed therein.

17. The method according to claim 16, wherein the configuring step further comprises rendering the edges of the filter media flat.

18. The method according to claim 16, wherein the corrugated media has a corrugation wave length and wherein the sine wave pattern has a pattern width between approximately ¼ to ¾ the corrugation wave length.

19. The method according to claim 16, wherein the corrugated media has a corrugation wave length and wherein the sine wave pattern has a pattern width approximately equal to ½ the corrugation wave length.

20. The method according to claim 16, wherein the wave length of the sine wave pattern is directly related to the depth of the media corrugation.

21. The method according to claim 16, wherein the wave length of the sine wave pattern is between approximately 1/16 and ⅛ inch.

22. The method according to claim 16, wherein the corrugations of the media comprise main corrugations configured perpendicular to the pleats and wherein the configuring steps further comprises imparting corrugation patterns in the filter media edges, the edge corrugation patterns being perpendicular to the main corrugations.

23. The method according to claim 22, wherein the wave length of the edge corrugation pattern is approximately equal to the wave length of the main corrugation pattern.

* * * * *

UNITED STATES PATENT AND TRADEMARK OFFICE
CERTIFICATE OF CORRECTION

PATENT NO. : 5,024,870
DATED : June 18, 1991
INVENTOR(S) : Jackson

It is certified that error appears in the above-identified patent and that said Letters Patent is hereby corrected as shown below:

In the abstract, line 5, "(b16)." should read --(16)--.

In the abstract, line 6, "plates" should read --pleats--.

In the abstract, line 7, "configued" should read --configured--.

In Column 4, line 56, delete "," after the word "under".

In Column 6, line 22, ",;" should read --);--.

In Column 6, line 43, delete "." before the word "Linear".

In Column 8, line 24, "." should read --;--.

In Column 9, line 13, insert --,-- after the word "slit".

In Column 12, claim 13, line 8, "to" should read --the--.

Signed and Sealed this

Ninth Day of February, 1993

Attest:

STEPHEN G. KUNIN

Attesting Officer

Acting Commissioner of Patents and Trademarks